UNITED STATES PATENT OFFICE.

MARY ELIZABETH STRO, OF GRANGEVILLE, IDAHO.

PROCESS FOR EXTRACTING BUTTER FAT FROM FRESH MILK OR CREAM.

No. 889,060.  Specification of Letters Patent.  Patented May 26, 1908.

Application filed August 14, 1907. Serial No. 388,480½.

*To all whom it may concern:*

Be it known that I, MARY ELIZABETH STRO, a citizen of the United States, and a resident of Grangeville, in the county and State of Idaho, have invented a new and Improved Process for Extracting Butter Fat from Fresh Milk or Cream, of which the following is a full, clear, and exact description.

This invention involves a new and improved process for the extracting of butter fat from fresh milk or cream, and the object of the invention is to rapidly sour fresh milk or cream to facilitate the separation of the butter fat, and, at the same time, without injuring in any way the butter resulting from the churning.

In dairies it is customary to add to the fresh milk or cream one or two per cent. of what is commonly known as "starter", namely, sour buttermilk or sour whey, which being in the process of fermentation starts the fresh milk or cream to sour at once and brings about a completion of the souring action in from twenty-four to thirty hours. In my improved process it is possible to sour the cream and permit of the churning of the same in a very much shorter time than is possible with the methods commonly employed.

In carrying out my improved process, I heat the sweet milk or cream to a temperature of approximately ninety-five degrees Fahrenheit, and then add from one to two teaspoonfuls of cream of tartar dissolved in a small quantity of warm water, for instance, about two ounces. The milk or cream is then stirred until thoroughly mixed, and set aside for two or three hours where the temperature will not fall below 70 degrees, Fahrenheit. The cream is then cooled and churned in the customary manner.

The result of a long series of tests shows that the cream of tartar affects the butter in no way as regards color, taste and smell, the butter produced being solid, sweet and wholesome and possessing marked keeping qualities. The cream of tartar can also be used in preparing cream for making what is commonly known as "cottage cheese", only about one-half the amount of cream of tartar employed in making butter being used, and after it has been thoroughly mixed with the milk or cream, the same is set aside for about two hours, at the end of which time it will be found that a fine curd has formed.

Having thus described my invention, I claim as new and desire to secure by Letters Patent:

1. A process for facilitating the separation of butter fat from cream in the preparing of the same for churning, consisting in adding thereto a small quantity of cream of tartar.

2. A process for extracting butter fat from fresh milk or cream, consisting in adding to each gallon of said milk or cream, approximately one teaspoonful of cream of tartar.

3. A process for extracting butter fat from fresh milk or cream, consisting in heating said milk or cream to a temperature of 95 degrees, Fahrenheit, adding thereto a small quantity of cream of tartar, maintaining the milk or cream at a temperature of approximately 70 degrees, Fahrenheit, for two or three hours, and then churning.

In testimony whereof I have signed my name to this specification in the presence of two subscribing witnesses.

MARY ELIZABETH STRO.

Witnesses:
　B. C. WILTSE,
　L. MAE WILTSE.